Nov. 6, 1928.
L. J. GEOHRING
AUTOMATIC GATE CONTROLLING DEVICE
Original Filed Jan. 31, 1927
1,690,972
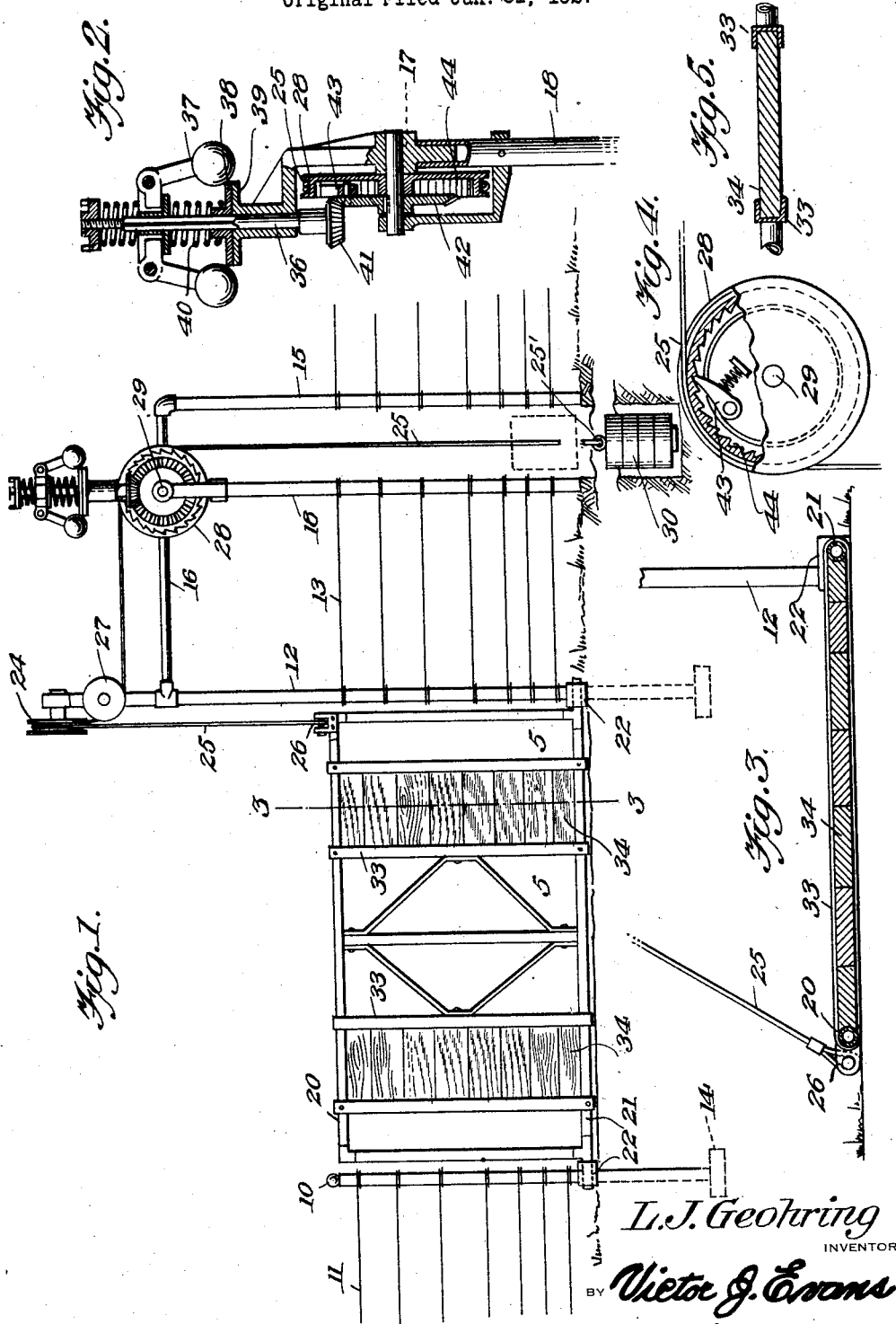
L. J. Geohring
INVENTOR
BY Victor J. Evans
ATTORNEY Patented Nov. 6, 1928.

1,690,972

UNITED STATES PATENT OFFICE.

LOUIE J. GEOHRING, OF WISHEK, NORTH DAKOTA.

AUTOMATIC GATE-CONTROLLING DEVICE.

Application filed January 31, 1927, Serial No. 164,967. Renewed April 17, 1928.

The object of this invention is to provide a gate mounted to move with reference to a lower horizontal axis, from vertical position to a horizontal and open position, the return movement under the action of a counterbalance, being checked by the operation of a governor.

A further object is to provide, in connection with a gate mounted as specified, a cable connected with the gate, a drum for the cable, and means controlling the speed of rotation of the drum in one direction, said drum being freely rotated during the opening movement of the gate, and speed being checked, during the closing movement, by the special means hereinafter disclosed.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view in elevation, showing a gate and portions of the fencing between which the gate structure is installed or mounted.

Figure 2 is a vertical section thru the devices controlled by the governor of Figure 1, for retarding the speed of the drum, and the return of the gate to vertical closed position, after having been thrown to horizontal and open position by the impact of a vehicle driven against the gate. The gate may however be otherwise controlled.

Figure 3 is a section on line 3—3 of Figure 1.

Figure 4 shows the ratchet mechanism in section and elevation.

Figure 5 is a section on line 5—5 of Figure 1, showing slabs or boards extending between vertical channel bars, employed in the construction of the gate.

A gate post 10 has connected therewith a plurality of wires 11, and another gate post 12, considerably higher than the post just mentioned, is connected with the section of fencing shown at 13. Posts 10 and 12 are each mounted in or on a suitable base 14, below the surface of the ground.

Another post 15 is mounted in the position illustrated, and constitutes a part of a frame of which the upper element 16 forms a member, this element 16 having connection with post 12 and also having connection at a point 17 with a post 18.

The gate includes upper and lower horizontal bars 20 and 21, the lower bar being formed with extensions mounted for rotation in the bearings 22 connected with posts 10 and 12. The gate thus mounted is adapted to move about a lower horizontal axis, and to lie flat when in open position, from which position it automatically returns to vertical and closed position.

A pulley wheel 24 is mounted at the upper end of post 12, and a cable 25 is connected with the gate at 26, and passes over pulley 24 and thence around pulley 27, from which point it passes to the drum 28 mounted for rotation about the axis 29. A cable 25 has its end portion 25' connected with weight or counterbalance 30, and this element will move to the upper or dotted line position of Figure 1 when the gate is fully open, and will return by gravity to the full line position of Figure 1 when a vehicle driven against and onto the gate has passed over the latter, so that there is no weight or pressure preventing the automatic return of the gate to closed position.

In order to provide a suitable track or the like for the wheels of the vehicle, I connect the upper and lower bars 20 and 21 of the gate by means of channel elements such as 33, these being arranged in two pairs as shown in Figure 1, and between the elements of each pair, I mount boards or the like shown at 34, so that a proper surface is provided, of such character that in reality tracks are formed.

Rotating with the drum 28 upon the return movement of the gate is a shaft 36 controlling a standard form of governor shown at 37, which in turn controls the position of the friction disk 38, which will engage disk 39 when the arms of the governor rise too far, so that the action of spring 40 is overcome, and the disk 38 is forced downwardly. Disk 39 constituting the stationary element is carried by the upper portion of the frame forming a part of the gate mounting structure.

Shaft 36 carries a pinion 41 meshing with the gear wheel 42, said gear wheel carrying a pivoted and spring-held pawl or dog 43 adapted to engage the internal teeth 44 of the drum 28. The drum is free to rotate during the opening movement of the gate, and independently of the gear wheel 42, but upon rotation of the drum in the other direction, incident to the downward movement of the counter-balance 30, the dog 43 will engage the teeth 44, and the gear wheel 42 keyed on shaft 29, will act as a locking device, so that the gear wheel will rotate with the drum, and this gear wheel 42 will drive pinion 41 and shaft 36 of the governor,—excessive speed being checked, as before indicated, when the arms of the governor rise sufficiently to cause disk 38 to contact with stationary disk 39.

Having described the invention what is claimed is:—

1. The combination with a gate mounted for movement about a horizontal axis, to open and closed position, of flexible means connected with the gate at its upper portion, a device for placing tension on the flexible means, a governor controlled brake, a drum over which the flexible means passes, and means for operating the governor by the movement of the drum in one direction.

2. The combination with a gate mounted for movement about a horizontal axis, to open and closed position, of flexible means connected with the gate at its upper portion, a device for placing tension on the flexible means, a governor controlled brake, a drum over which the flexible means passes, a shaft for the governor, and pawl and ratchet mechanism operatively connected with the drum and shaft.

3. The combination with a gate mounted for movement about a horizontal axis, to open and closed position, of a cable connected with the upper portion of a gate, a weight connected with one end of the cable, a drum over which the cable passes, a gear wheel, a shaft and pinion driven by the gear wheel, a governor operatively connected with the shaft, means for retarding the speed of the shaft upon the operation of the governor, and pawl and ratchet mechanism between said drum and gear wheel.

In testimony whereof I affix my signature.

LOUIE J. GEOHRING.